United States Patent
Webber et al.

(10) Patent No.: US 10,267,891 B1
(45) Date of Patent: Apr. 23, 2019

(54) RAPID TRANSFER OF GNSS INFORMATION FROM ADVANTAGED PLATFORM

(71) Applicant: The United States of America, as represented by the Secretary of the Air Force, Washington, DC (US)

(72) Inventors: Frederick Webber, Xenia, OH (US); Eric Vinande, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/958,371

(22) Filed: Apr. 20, 2018

Related U.S. Application Data (60) Provisional application No. 62/563,939, filed on Sep. 27, 2017.

(51) Int. Cl.
*H04W 24/00* (2009.01)
*G01S 5/00* (2006.01)
(Continued)

(52) U.S. Cl.
CPC .......... *G01S 5/0072* (2013.01); *H04B 5/0031* (2013.01); *H04W 4/80* (2018.02); *H04W 64/003* (2013.01)

(58) Field of Classification Search
CPC ..... H04W 4/80; H04W 64/003; H04W 64/00; H04W 76/10; H04W 4/20; H04W 24/00;
(Continued)

(56) References Cited

U.S. PATENT DOCUMENTS 6,816,782 B1 * 11/2004 Walters .................. G01C 21/20
701/426
6,982,639 B2 * 1/2006 Brackett ............. G07C 9/00111
340/286.07
(Continued)

FOREIGN PATENT DOCUMENTS

CN 103325269 A * 9/2013
KR 101746369 B1 * 6/2017

OTHER PUBLICATIONS

Ozdenizci, B., et al., "NFC Internal: An Indoor Navigation System," Sensors 2015, 15, pp. 7571-7595, Mar. 25, 2015.
(Continued)

*Primary Examiner* — Mahendra Patel
(74) *Attorney, Agent, or Firm* — AFMCLO/JAZ; Jeff Moore (57) ABSTRACT

A system and method for transferring data includes an information platform to identify a navigational position of the information platform; a first near field communication (NFC) device attached to the information platform to transmit navigational position data; and a second NFC device to receive the navigational position data from the first NFC device through a NFC data transfer process to establish a navigational position of the second NFC device relative to the first NFC device and without further communication from the first NFC device. The information platform may be stationary. The information platform may be moving. The information platform may include any of a global navigation satellite system (GNSS) platform, an inertial navigation system, and a cell phone. The NFC data transfer process may occur within one second.

7 Claims, 10 Drawing Sheets

(51) Int. Cl.
*H04B 5/00* (2006.01)
*H04W 64/00* (2009.01)
*H04W 4/80* (2018.01)

(58) Field of Classification Search
CPC ......... H04W 4/02; H04B 5/0031; H04B 5/00;
G06Q 20/16; G06Q 20/32; G06Q 20/40;
G01S 5/0072; G01S 1/00; G01S 19/05;
G01S 19/42; G01S 19/27; G01S 1/68
USPC .................. 455/456.1, 456.2; 705/44, 39;
342/357.25
See application file for complete search history.

(56) References Cited

U.S. PATENT DOCUMENTS

| | | | |
|---|---|---|---|
| 8,219,028 B1 | 7/2012 | Flamholz | |
| 8,412,185 B2 | 4/2013 | Cader et al. | |
| 8,634,846 B2 | 1/2014 | Garrett et al. | |
| 8,718,549 B2 | 5/2014 | Hagedorn | |
| 8,787,944 B2 | 7/2014 | Smith | |
| 8,831,514 B2 | 9/2014 | Tysowski | |
| 8,838,135 B2* | 9/2014 | Moshfeghi | G01S 19/48 |
| | | | 455/456.1 |
| 8,884,817 B2 | 11/2014 | Seymour | |
| 9,026,105 B2 | 5/2015 | Shipley et al. | |
| 9,048,882 B2 | 6/2015 | Yang et al. | |
| 9,058,702 B2* | 6/2015 | Chao | G07C 9/00111 |
| 9,084,215 B2 | 7/2015 | Honkanen et al. | |
| 9,100,064 B2* | 8/2015 | Griffin | H04B 5/02 |
| 9,264,104 B2* | 2/2016 | Park | G06Q 50/01 |
| 9,332,394 B2 | 5/2016 | Moshfeghi | |
| 9,357,496 B2 | 5/2016 | Bahl et al. | |
| 9,363,635 B2 | 6/2016 | Finlow-Bates et al. | |
| 9,369,843 B2 | 6/2016 | Rudow et al. | |
| 9,513,127 B2 | 12/2016 | Goldman et al. | |
| 2005/0227709 A1* | 10/2005 | Chang | G01S 19/05 |
| | | | 455/456.1 |
| 2007/0139191 A1* | 6/2007 | Quatro | G06Q 10/08 |
| | | | 340/539.13 |
| 2007/0254676 A1* | 11/2007 | Pedigo | G01S 19/05 |
| | | | 455/456.6 |
| 2009/0012667 A1* | 1/2009 | Matsumoto | G05D 1/0251 |
| | | | 701/26 |
| 2010/0066599 A1* | 3/2010 | Liu | G01S 19/05 |
| | | | 342/357.31 |
| 2010/0190436 A1 | 7/2010 | Cook et al. | |
| 2011/0084825 A1* | 4/2011 | John | G08G 1/123 |
| | | | 340/438 |
| 2012/0190386 A1* | 7/2012 | Anderson | G01C 15/04 |
| | | | 455/456.3 |
| 2012/0246074 A1* | 9/2012 | Annamalai | G01S 1/68 |
| | | | 705/44 |
| 2013/0275039 A1* | 10/2013 | Sathish | G01C 21/3667 |
| | | | 701/409 |
| 2014/0274111 A1* | 9/2014 | Edge | H04W 4/023 |
| | | | 455/456.1 |
| 2016/0261658 A1* | 9/2016 | Taylor | H04L 65/4076 |
| 2016/0295388 A1* | 10/2016 | Vasic | H04W 4/90 |
| 2016/0328341 A1 | 11/2016 | Hall | |
| 2017/0299724 A1 | 10/2017 | Hsu et al. | |
| 2018/0292542 A1* | 10/2018 | Anand | G01S 19/48 |

OTHER PUBLICATIONS

Maghdid, H., et al., "UNILS: Unconstrained Indoors Localization Scheme based on cooperative smartphones networking with onboard inertial, Bluetooth and GNSS devices," IEEE, pp. 129-136, May 30, 2016.

* cited by examiner

RAPID TRANSFER OF GNSS INFORMATION FROM ADVANTAGED PLATFORM

CROSS-REFERENCE TO RELATED APPLICATION(S)

This application claims the benefit of U.S. Provisional Patent Application No. 62/563,939 filed on Sep. 27, 2017, which is incorporated herein by reference in its entirety.

GOVERNMENT INTEREST

The invention described herein may be manufactured and used by or for the Government of the United States for all government purposes without the payment of any royalty.

BACKGROUND

Field of the Invention

The embodiments herein generally relate to navigation techniques, and more particularly to navigation systems in degraded environments.

Background of the Invention

Initializing a navigation system typically requires time to acquire a global navigation satellite system (GNSS) signal or manual entry. Typically, to transfer information from one device to another without manual data entry, it is necessary to negotiate some form of connection. This includes physical connections, such as a manual Universal Serial Bus (USB) or Ethernet attachment, as well as wireless methods, such as selecting a network for Wi-Fi® connections or a peer for Bluetooth® connections. However, in situations where there is limited-to-no positional or navigational connectivity, such forms of data transfer are difficult to achieve.

There are challenges in providing positioning and navigation information when information from a global positioning system (GPS) or other GNSS is degraded, denied, or otherwise unavailable. Environments such as jungles and urban canyon areas or where cell tower coverage is unavailable are of particular interest for considering techniques to provide positioning and navigation information.

BRIEF SUMMARY OF THE INVENTION

In view of the foregoing, an embodiment herein provides an embodiment herein provides a system for transferring data, the system comprising an information platform to identify a navigational position of the information platform; a first near field communication (NFC) device attached to the information platform to transmit navigational position data; and a second NFC device to receive the navigational position data from the first NFC device through a NFC data transfer process to establish a navigational position of the second NFC device relative to the first NFC device and without further communication from the first NFC device. The information platform may be stationary. The information platform may be moving. The information platform may comprise any of a GNSS platform, an inertial navigation system, and a cell phone. The NFC data transfer process may occur within one second.

Another embodiment provides a system for providing portable and relative navigation data, the system comprising a GNSS communication device to identify a position estimate of the GNSS communication device, wherein the GNSS communication device comprises a first short-range transceiver device to store and transmit the position estimate; and a second short-range transceiver device without positional awareness of its location, wherein the second short-range transceiver device is to receive a NFC transmission of the position estimate from the first short-range transceiver device; become positionally aware of a location of the first short-range transceiver device; and initialize a starting navigational position of the second short-range transceiver device based on the position estimate.

The second short-range transceiver device may receive the position estimate from the first short-range transceiver device within one second. The second short-range transceiver device may be positioned within a predetermined distance from the first short-range transceiver device for receiving the position estimate through the NFC transmission. The predetermined distance may be less than 10 cm. The second short-range transceiver device may receive the position estimate without wireless broadcast of the position estimate to other communication devices. The second short-range transceiver device may receive any of (i) a time estimate from the first short-range transceiver device, and (ii) an estimate of position accuracy from the first short-range transceiver device. The second short-range transceiver device may initialize the starting navigational position based only on the position estimate provided by the first short-range transceiver device. The second short-range transceiver device may comprise any of a cell phone and a computer without a broadcast connection to a communication network.

Another embodiment provides a method of transferring navigational data, the method comprising identifying a position estimate of an information platform; transferring the position estimate from the information platform to a communication device that does not have self-position acquisition ability using a NFC data transfer; the communication device becoming positionally aware of a location of the communication device upon receiving the position estimate; and updating a navigational position of the communication device based on the position estimate.

The transferring may comprise encoding the position estimate to a tag device. The transferring may comprise storing a predetermined number of historical position estimates on the tag device and/or at least one historical position estimates. The method may comprise the communication device initiating a transfer of the position estimate from the information platform through the tag device to the communication device. Additional communication devices may each initiate a subsequent transfer of the position estimate from the information platform through the tag device to each additional communication device. The tag device may comprise a memory component that does not require electrical power to store the position estimate. The tag device may comprise a NFC component to transceive the position estimate. The method may comprise positioning the communication device within 10 cm from the information platform to perform the NFC data transfer; and transferring the position estimate from the information platform to the communication device within one second.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE INVENTION

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

According to various examples, the embodiments herein provide a system and method to serve as a means to rapidly transfer position information from an advantaged GNSS receiver platform for the purposes of initializing or updating another device. The transfer method is NFC, according to an example, and may result in a successful transfer in tenths of a second. The system includes an advantaged position information platform, which can be a GNSS receiver, another device with a position estimate, such as an inertial navigation system or cell phone using trilateration, or an immobile object, which has by definition a static position. A NFC device is attached to an advantaged platform. A receiving device is also provided, such as a cell phone or embedded computer, and which has NFC capability. The data being transferred may include navigational data and timing data. Practical initialization of man-portable relative navigation systems (such as inertial systems) in GNSS-degraded and GNSS-denied environments is challenging due to time constraints, and due to security concerns with broadcasting data wirelessly. The embodiments herein use NFC to make inertial or related systems practical by reducing the exchange and starting position initialization time to under a second, while also ensuring that the system is unreadable from more than a few cm away. In one embodiment it is not readable from more than about one decimeter away.

As such, the embodiments herein utilize NFC as a secure close-range information transfer method, to transfer information two orders of magnitude faster than conventional means. Additionally, in some configurations, a device without power may initialize a powered navigation system with high precision. Referring now to the drawings, and more particularly to FIGS. 1 through 14 where similar reference characters denote corresponding features consistently throughout, there are shown exemplary embodiments. In the drawings, the size and relative sizes of layers and regions may be exaggerated for clarity.

Figure 1:
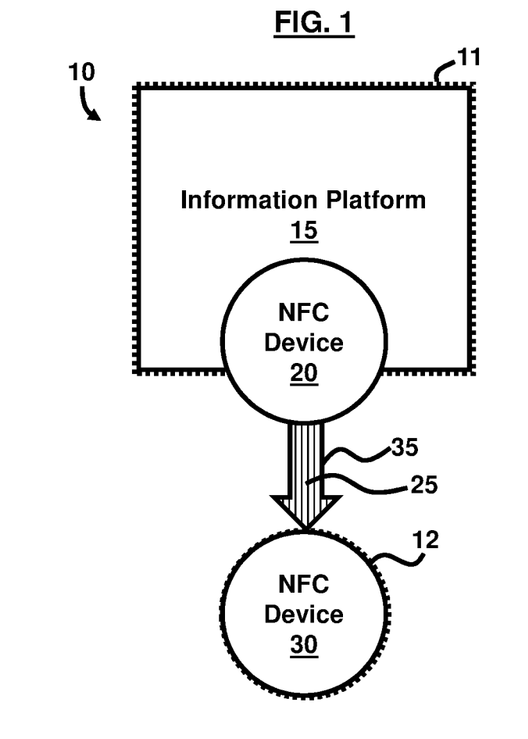
FIG. 1 is a block diagram illustrating a system for transferring data, according to an embodiment herein.

FIG. 1 is a block diagram illustrating a system 10 for transferring data. The system 10 comprises an information platform 15 to identify a navigational position 11 of the information platform 15. In an example, the information platform 15 may be a device that provides a relative estimate that is advantaged. For example, a vehicle such as a car or helicopter, etc. with a powerful inertial navigation system that knows where it started and where it is facing, even without any GNSS at all, has an advantaged estimate over something without. In an example, the navigational position 11 may be generated in real time as the position of the information platform 15 changes by communication through a GPS (not shown). According to an example, the navigational position 11 may be a set of coordinates; i.e., longitude and latitude coordinates, or any suitable reference coordinate system. In another example, the navigational position 11 may be stored in a memory component (not shown in FIG. 1) of the information platform 15, such as in a cache memory, and the information platform 15 identifies its navigational position 11 based on the most recent coordinates retrieved through signal communication with a GPS and stored in the memory component, even if subsequent signal communication with the GPS ceases. The cache memory may reset periodically at a predetermined time to attempt to retrieve the most updated navigational position 11. This may occur in the event the information platform 15 loses communication with an associated GPS for a specified amount of time, either due to loss of signal in terrain with limited or no access to the GPS, or in situations where the connection to the GPS is deliberately turned off (i.e., in covert or military operations, etc.).

A first NFC device 20 is attached to the information platform 15 to transmit navigational position data 25. In an example, the first NFC device 20 operates at 13.56 MHz and at data exchange rates ranging from approximately 106 kbit/s to 424 kbit/s. In one example, the navigational position data 25 may comprise the navigational position 11 of the information platform 15. In another example, the navigational position data 25 may comprise navigational position data 25 associated with a pre-set position associated with, and stored in, the first NFC device 20. A second NFC device 30 is provided to receive the navigational position data 25 from the first NFC device 20 through a NFC data transfer process 35 to establish a navigational position 12 of the second NFC device 30 relative to the first NFC device 20 and without (e.g., does not require) further communication from the first NFC device 20. In an example, the NFC data transfer process 35 may comprise a near field localization process.

The near field localization uses the most current, high-quality position estimate from the navigational position data 25 provided by the information platform 15. The near field localization uses NFC protocols whereby the navigational position data 25 may be transferred using radio-frequency identification (RFID) standards or other suitable wireless or wired data transfer standard. The first NFC device 20 is a storage and transmission device, and not a way to itself generate a position solution itself.

Figure 2A:
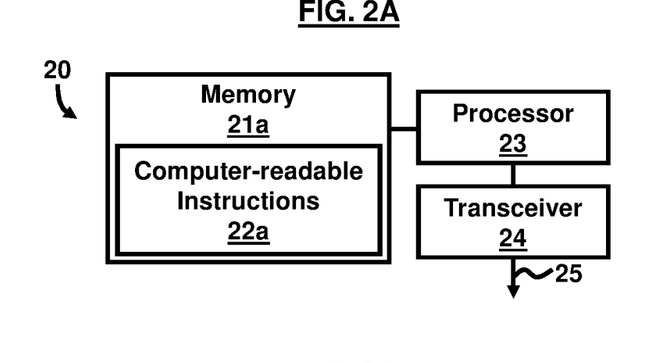
FIG. 2A is a block diagram illustrating a first example of the first NFC device of FIG. 1, according to an embodiment herein.
Figure 2B:
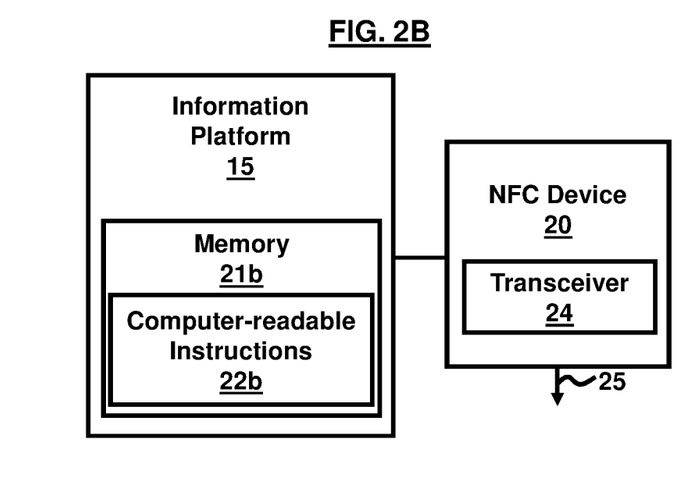
FIG. 2B is a block diagram illustrating a second example of the first NFC device of FIG. 1 coupled to the information platform, according to an embodiment herein.

FIGS. 2A and 2B, with reference to FIG. 1, illustrate different configurations of the first NFC device 20, according to the embodiments herein. In FIG. 2A, the first NFC device 20 functions as an active device and comprises memory 21a that stores computer-readable instructions 22a to read data stored the second NFC device 30, and a processor 23 that executes the computer-readable instructions 22a. A transceiver 24 is provided to transmit the navigational position data 25 based on the computer-readable instructions 22a. In examples, the memory 21a may be RAM memory, or any other suitable storage media, and the processor 23 may be a central processing unit (CPU), multiple CPUs, microprocessors, hardware engines, and/or other hardware processing devices. In FIG. 2B, the first NFC device 20 functions as a passive device. The memory 21b and computer-readable instructions 22b to read data stored 31 (shown in FIGS. 2C and 2D) in the second NFC device 30 are stored in the information platform 15. The transceiver 24 of the first NFC device 20 transmits the navigational position data 25 based on the computer-readable instructions 22b from the information platform 15. In either of the examples provided in FIG. 2A or 2B, the first NFC device 20 may be removably coupled to the information platform 15, and the first NFC device 20 may be powered by the information platform 15 or may be powered by some other source.

Figure 2C:
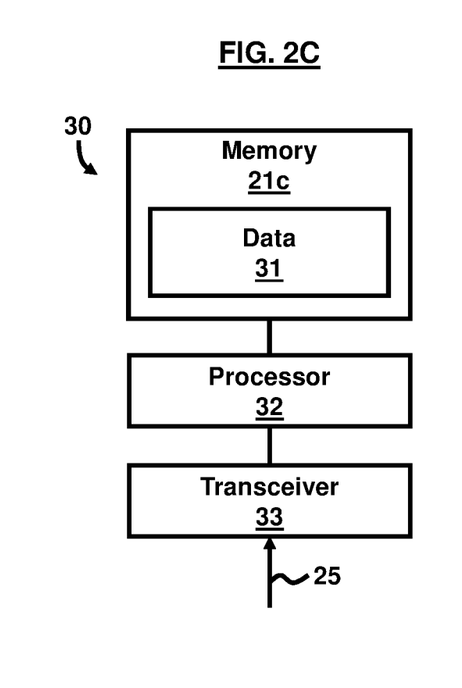
FIG. 2C is a block diagram illustrating an example of the second NFC device of FIG. 1, according to an embodiment herein.
Figure 2D:
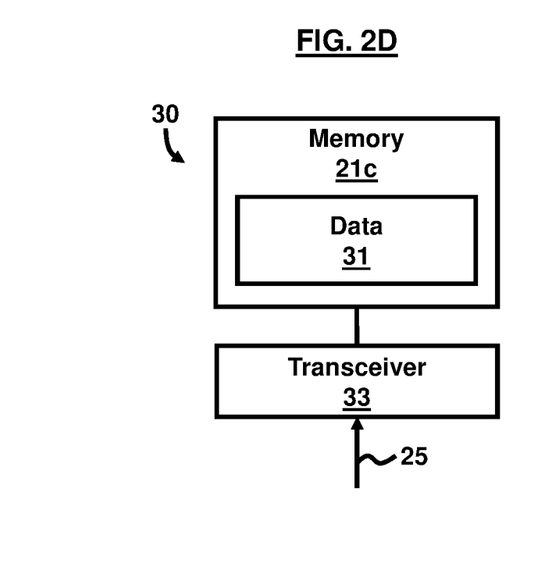
FIG. 2D is a block diagram illustrating another example of the second NFC device of FIG. 1, according to an embodiment herein.

FIGS. 2C and 2D, with reference to FIGS. 1 through 2B, illustrates the second NFC device 30. The second NFC device 30 may be configured in a peer-to-peer configuration with the first NFC device 20 in order to receive the navigational position data 25. In one example, the second NFC device 30 is an active device, as shown in FIG. 2C, comprising its own processor to process the navigational position data 25 and the data 31 stored on memory 21c. The transceiver 33 is provided to receive the navigational position data 25. In another example shown in FIG. 2D, the second NFC device 30 is purely a passive device without any functional processing capabilities, and receives the navigational position data 25 from transceiver 33 and stores it in memory 21c. The second NFC device 30 is configured to not have any navigational/positional on its own, but utilizes the navigational position data 25 to become navigationally/positionally aware based on the peer-to-peer transfer established between transceivers 24, 33 of the first NFC device 20 and second NFC device 30, respectively.

Figure 3A:
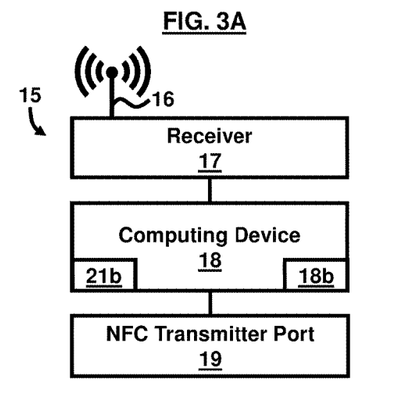
FIG. 3A is a block diagram illustrating the information platform of FIG. 1, according to an embodiment herein.

As shown in FIG. 3A, with reference to FIGS. 1 through 2B, the information platform 15 may comprise an antenna 16, a receiver 17, a computing device 18, and a NFC transmitter port 19. The antenna 16 may comprise any suitable type of antenna including omnidirectional or directional antennas. The receiver 17 is configured to receive signals through the antenna 16, wherein the signals may comprise GPS signals to establish the navigational position 11 of the information platform 15. A computing device 18 is provided to store the navigational position 11 in memory 21b and to process the navigational position 11 in processor 18b for transmission through a NFC transmitter port 19. The NFC transmitter port 19 is configured to connect with the first NFC device 20.

Figure 3B:
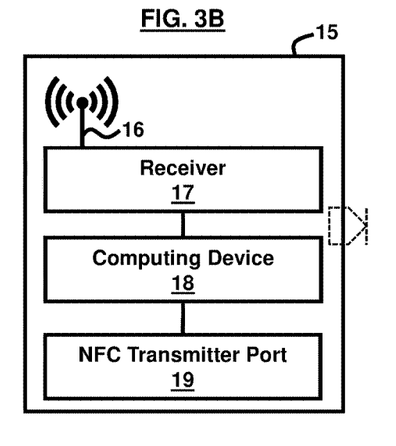
FIG. 3B is a block diagram illustrating the information platform of FIG. 1 in a stationary configuration, according to an embodiment herein.

As shown in FIG. 3B, with reference to FIGS. 1 through 3A, the information platform 15 may be stationary or may be attached to a stationary object. For example, not all stationary objects require a receiver, thus the antenna 16 and receiver 17 are optional in some cases involving a stationary object. As a non-limiting example, a light pole or telephone pole does not move, and one could survey it with another device, and the light pole acts as the information platform 15.

Figure 3C:
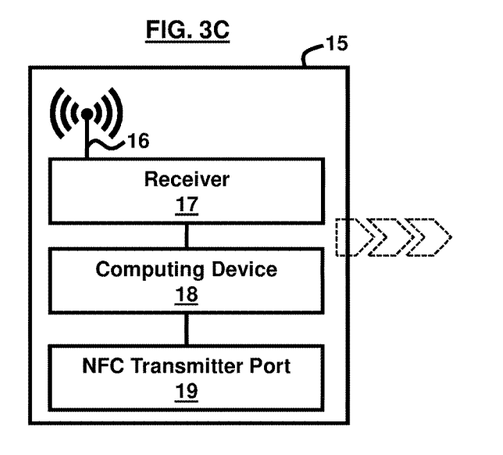
FIG. 3C is a block diagram illustrating the information platform of FIG. 1 in a moving configuration, according to an embodiment herein.
Figure 3D:
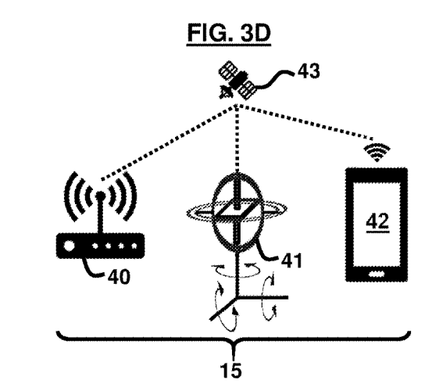
FIG. 3D is a schematic diagram illustrating examples of the information platform of FIG. 1, according to an embodiment herein.

As shown in FIG. 3C, with reference to FIGS. 1 through 3B, the information platform 15 may be moving or may be attached to a moving object. As shown in FIG. 3D, with reference to FIGS. 1 through 3C, the information platform 15 may comprise any of a GNSS platform 40, an inertial navigation system 41, and a cell phone 42, which may be communicatively linked to a GPS 43. The NFC data transfer process 35 may occur within one second, in an example. Additionally, in other examples, the NFC data transfer process 35 may occur in much less than one second (e.g., less than 0.25 seconds) depending on the processing speed of processor 18*b*.

Figure 4:
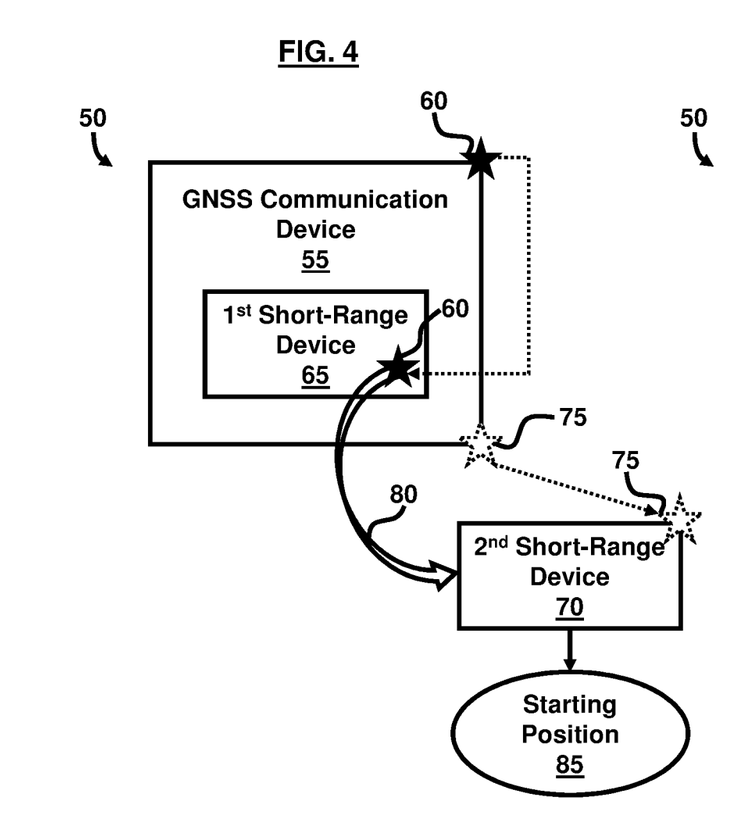
FIG. 4 is a block diagram illustrating a system for providing portable and relative navigation data, according to an embodiment herein.

FIG. 4, with reference to FIGS. 1 through 3C, illustrates a system 50 for providing portable and relative navigation data. The system 50 comprises a GNSS communication device 55 to identify a position estimate 60 of the GNSS communication device 55. In other examples, the GNSS communication device 55 may be replaced with a device that provides an absolute estimate that is advantaged (i.e., information platform 15 of FIG. 1). The GNSS communication device 55 comprises a first short-range transceiver device 65 to store and transmit the position estimate 60. A second short-range transceiver device 70 is provided without positional awareness of its own location 75. The second short-range transceiver device 70 is to receive a NFC transmission 80 of the position estimate 60 from the first short-range transceiver device 65, become positionally aware of a location 75 of the first short-range transceiver device 65, and initialize a starting navigational position 85 of the second short-range transceiver device 70 based on the position estimate 60. The second short-range transceiver device 70 is able to perform these functions using only the data received through the NFC transmission 80.

The second short-range transceiver device 70 may comprise a processor (not shown) to read the data, according to an example. Furthermore, in an example, the first and second short-range transceiver devices 65, 70 may be similarly configured to the first and second NFC devices 20, 30 (of FIGS. 1 through 2D), respectively, and the description of those features as described above are not repeated here. In an example, the starting navigational position 85 may refer to the initialized starting location/coordinate established/set for the second short-range transceiver device 70 as a result of receiving the position estimate 60 of the first short-range transceiver device 65. Accordingly, once the second short-range transceiver device 70 receives the position estimate 60 through the NFC transmission 80 from the first short-range transceiver device 70, the second short-range transceiver device 70 becomes positionally aware of its location 75 from a previous state of being positionally unaware of its location 75.

Figure 5:
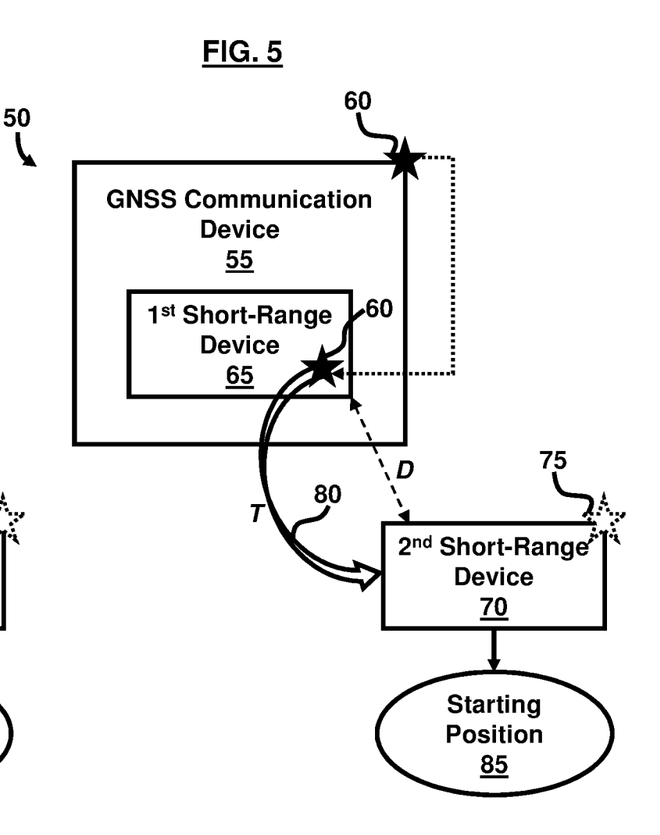
FIG. 5 is a block diagram illustrating positional configurations of a first short-range transceiver device relative to a second short-range transceiver device, according to an embodiment herein.

As shown in FIG. 5, with reference to FIGS. 1 through 4, the second short-range transceiver device 70 may be positioned within a predetermined distance D from the first short-range transceiver device 65 for receiving the position estimate 60 through the NFC transmission 80. The predetermined distance D may be less than 10 cm, according to an example. The second short-range transceiver device 70 may receive the position estimate 60 from the first short-range transceiver device 65 within a predetermined time T, which may be within one second, according to an example. The second short-range transceiver device 70 may initialize the starting navigational position 85 based only on the position estimate 60 provided by the first short-range transceiver device 65.

Figure 6:
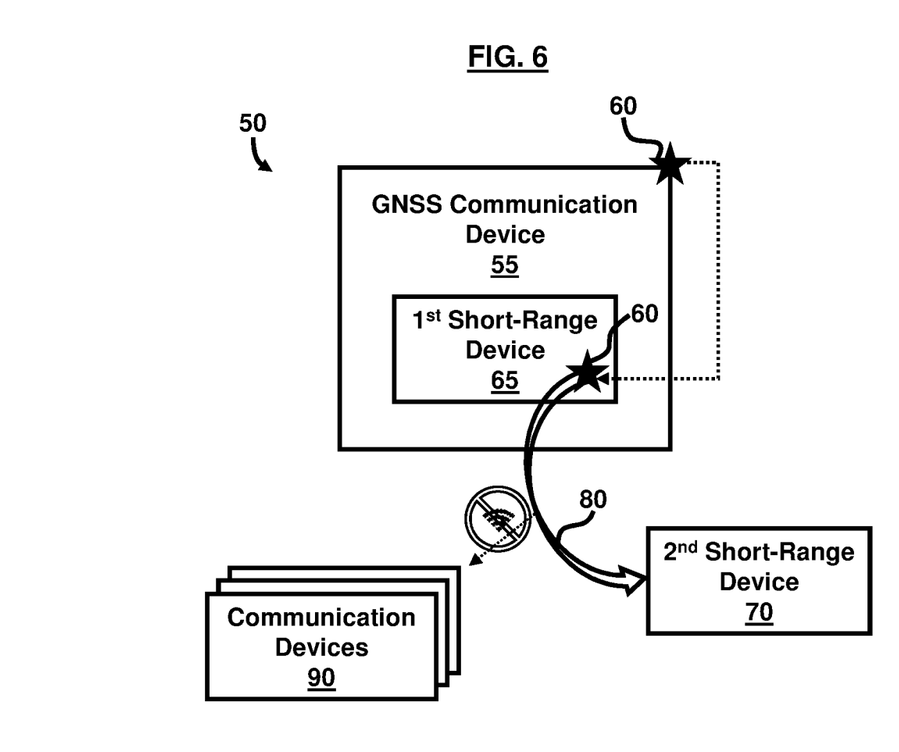
FIG. 6 is a block diagram illustrating a system for providing portable and relative navigation data relative to other communication devices, according to an embodiment herein.

As shown in FIG. 6, with reference to FIGS. 1 through 5, the second short-range transceiver device 70 may receive the position estimate 60 without wireless broadcast of the position estimate 60 to other communication devices 90. In this regard, there may be other communication devices 90 proximately located to any of the first short-range transceiver device 65 and second short-range transceiver device 70, but the position estimate 60 is only provided through the NFC transmission 80 and not through a wireless broadcast apart from the NFC transmission 80.

Figure 7:
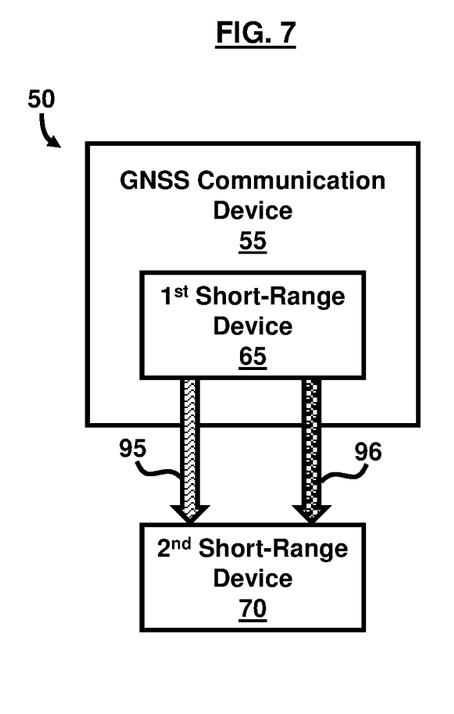
FIG. 7 is a block diagram illustrating various types of data transfer occurring between a first short-range transceiver device relative and a second short-range transceiver device, according to an embodiment herein.
Figure 8:
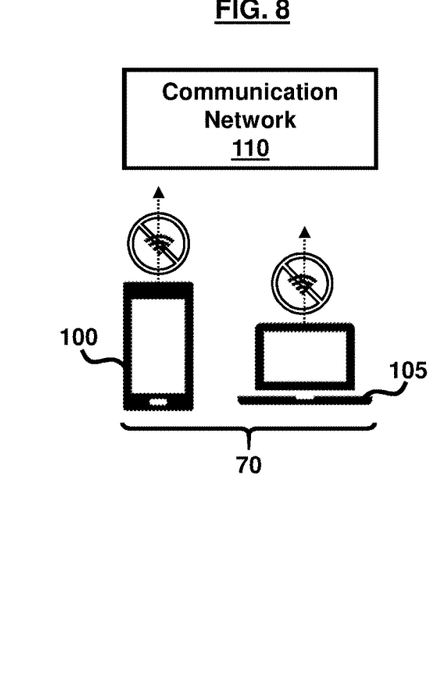
FIG. 8 is a block diagram illustrating examples of the second short-range transceiver device of FIGS. 4 through 7, according to an embodiment herein.

As shown in FIG. 7, with reference to FIGS. 1 through 6, the second short-range transceiver device 70 may receive any of (i) a time estimate 95 from the first short-range transceiver device 65, and (ii) an estimate of position accuracy 96 from the first short-range transceiver device 65. In this regard, the time estimate 95 may include a timestamp of signal transmissions to and/or from the first short-range transceiver device 65, according to an example. Moreover, the estimate of position accuracy 96 may include an estimate of the coordinates/location of the first short-range transceiver device 65, which may merely be an estimate based on whether the signal from a GPS that provides the coordinates/location is currently active or has been degraded/denied connectivity to the first short-range transceiver device 65. In an example, as shown in FIG. 8, with reference to FIGS. 1 through 7, the second short-range transceiver device 70 may comprise any of a cell phone 100 and a computer 105 without a broadcast connection to a communication network 110. The cell phone 100 may be configured as any type of cellular phone or smartphone, according to the examples. Moreover, the computer 105 may be configured as any type of computing device including a laptop, tablet, or any other type of computer including fixed or portable devices.

Figure 9:
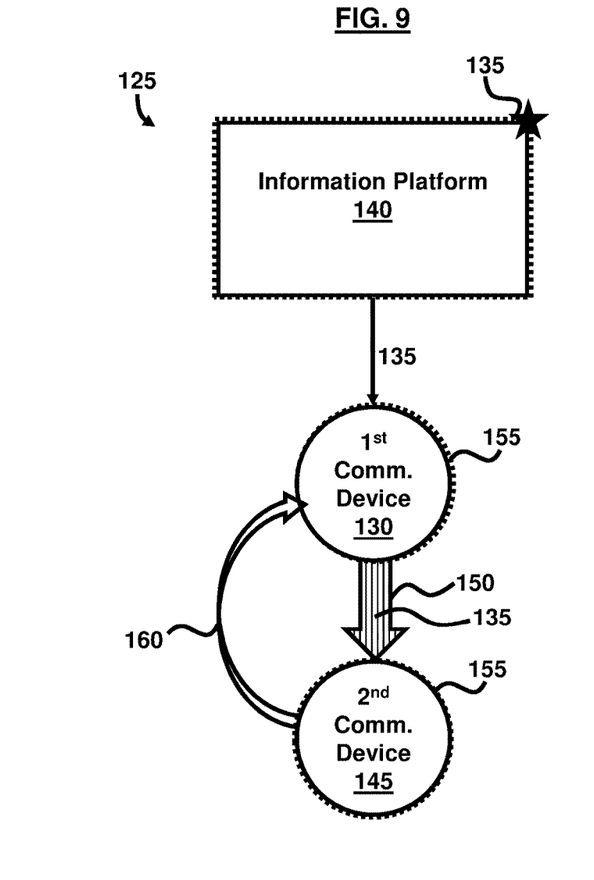
FIG. 9 is a block diagram illustrating a system of transferring navigational data, according to an embodiment herein.

FIG. 9, with reference to FIGS. 1 through 8, illustrates a system 125 of transferring navigational data. The system 125 comprises a first communication device 130 to identify a position estimate 135 of an information platform 140. In an example, the first communication device 130 may be part of the information platform 140. In another example, the first communication device 130 may be separate from the information platform 140, but is communicatively coupled thereto. The first communication device 130 transfers the position estimate 135 from the information platform 140 to a second communication device 145 that does not have self-position acquisition ability using a NFC data transfer 150. The second communication device 145 becomes positionally aware of a location 155 of the first communication device 130 upon receiving the position estimate 135. The first communication device 130 updates a navigational position 160 of the second communication device 145 based on the position estimate 135. According to various examples, the first and second communication devices 130, 145 may be any type of device operable to transceive electronic data. In an example, both the first and second communication devices 130, 145 may be pre-programmed with security protocols to ensure that they are permitted to engage in the NFC data transfer 150 with one another including the type of data that is permitted to be included in the NFC data transfer 150.

Figure 10:
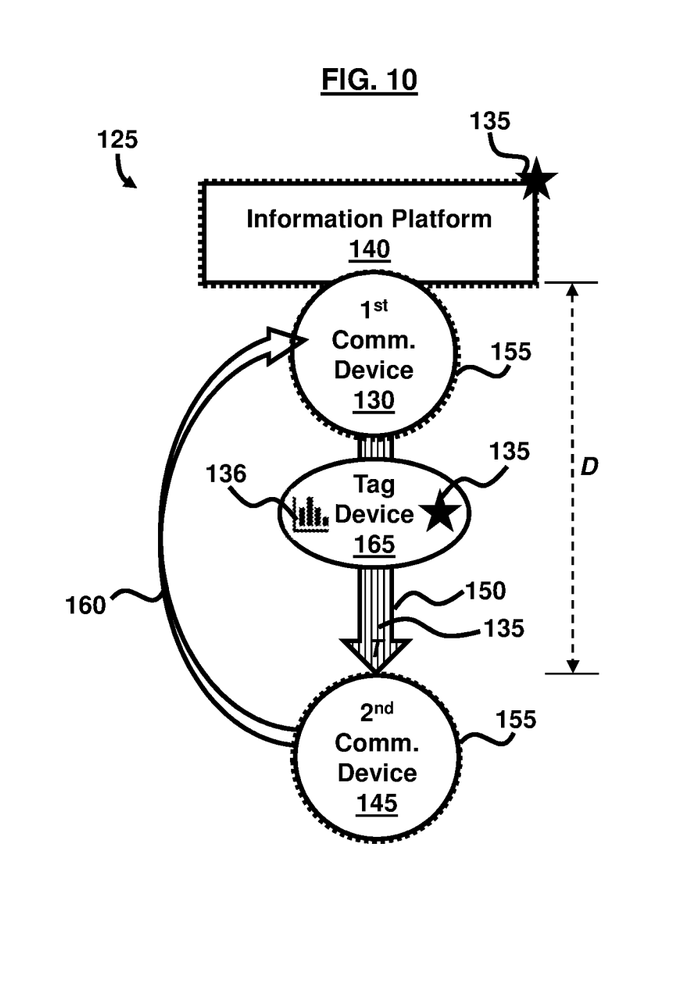
FIG. 10 is a block diagram illustrating the system of transferring navigational data of FIG. 9 with an intermediary tag device, according to an embodiment herein.

As shown in FIG. 10, with reference to FIGS. 1 through 9, the transferring of the position estimate 135 by the first communication device 130 may comprise encoding the position estimate 135 to a tag device 165. In an example, the position estimate 135 may be encoded using any suitable encoding technique associated with signal processing technologies such as analog modulation, Pulse Code Modulation (PCM), Amplitude Shift Keying (ASK), Frequency Shift Keying (FSK), and Phase Shift Keying (PSK), as well as other encoding techniques. In an example, the tag device 165 may be a passive NFC device with a memory component 175 (further shown in FIG. 12). The transferring of the position estimate 135 by the first communication device 130 may comprise storing a predetermined number of historical position estimates—and/or at least one historical position estimates 136 on the tag device 165 (i.e., in the memory component 175). In this regard, the historical position estimates 136 may include previous position locations and/or estimates associated with any of the information platform 140 and the first communication device 130, and stored in memory (e.g., cache memory, for example) in the information platform 140 and/or first communication device 130 and transmitted to the tag device 165 through the NFC data transfer 150.

The second communication device 145 may initiate a transfer of the position estimate 135 from the information platform 140 through the tag device 165 to the second communication device 145. The second communication device 145 may be positioned within a predetermined distance D from the information platform 140 to perform the NFC data transfer 150 thereby initiating the transfer of the position estimate 135 simply by being within the predetermined distance D and having a suitable predetermined authorization to engage in the NFC data transfer 150. According to an example, the predetermined authorization may be pre-programmed into the second communication device 145 using an authorization code. In one example the predetermined distance D may be approximately 10 cm. The position estimate 135 may be transferred from the information platform 140 to the second communication device 145 within a predetermined time T, and in one example the predetermined time T may be approximately within one second.

Figure 11:
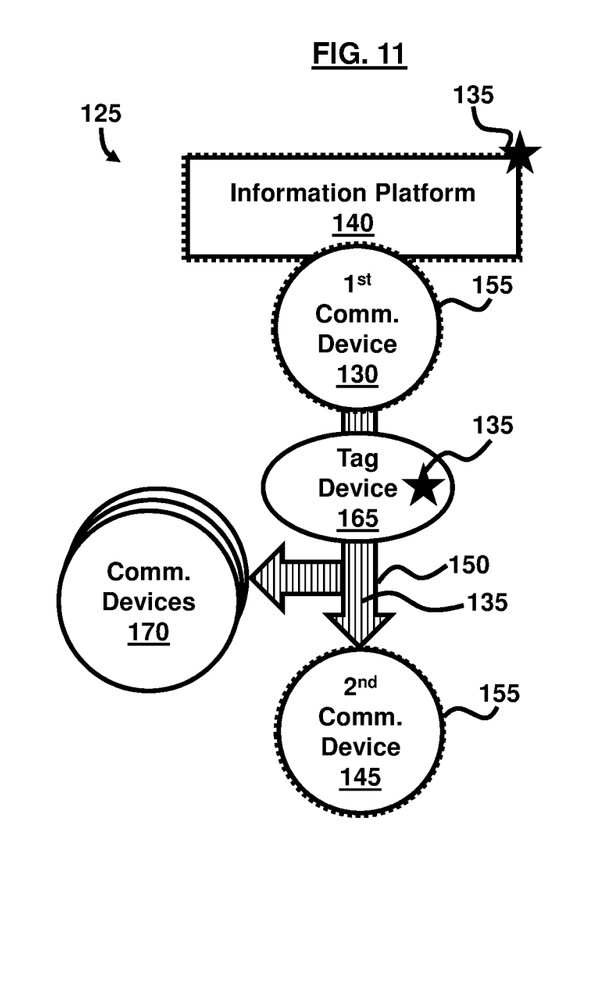
FIG. 11 is a block diagram illustrating the system of transferring navigational data of FIG. 9 with an intermediary tag device and other communication devices, according to an embodiment herein.
Figure 12:
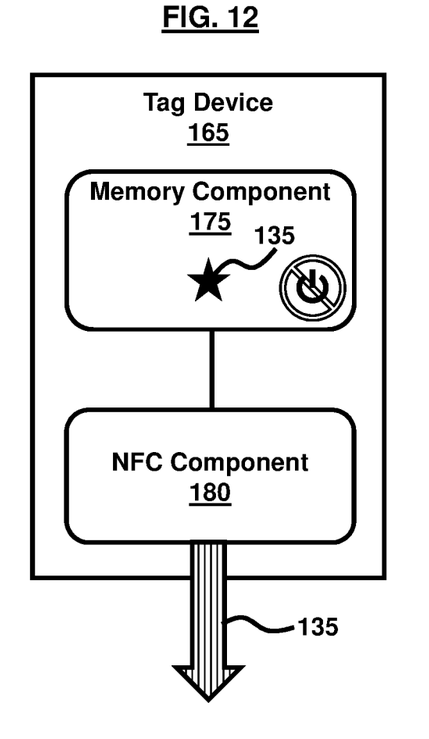
FIG. 12 is a block diagram illustrating the tag device of FIGS. 10 and 11, according to an embodiment herein.

As shown in FIG. 11, with reference to FIGS. 1 through 10, additional communication devices 170 may each initiate a subsequent transfer of the position estimate 135 from the information platform 140 through the tag device 165 to each additional communication device 170. According to various examples, the additional communication devices 170 may each of their own processing capabilities to initiate the corresponding transfer of the position estimate 135 from the information platform 140. As shown in FIG. 12, with reference to FIGS. 1 through 10, the tag device 165 may comprise a memory component 175 that does not require electrical power to store the position estimate 135. In this regard, the tag device 165 does not require its own power source to remain functional, and as such may simply function as a passive tag, and may be configured as a RFID tag, according to an example. The tag device 165 may comprise a NFC component 180 to transceive the position estimate 135. The NFC component 180 may comprise suitable hardware and/or software to perform and/or engage the NFC data transfer 150.

Figure 13A:
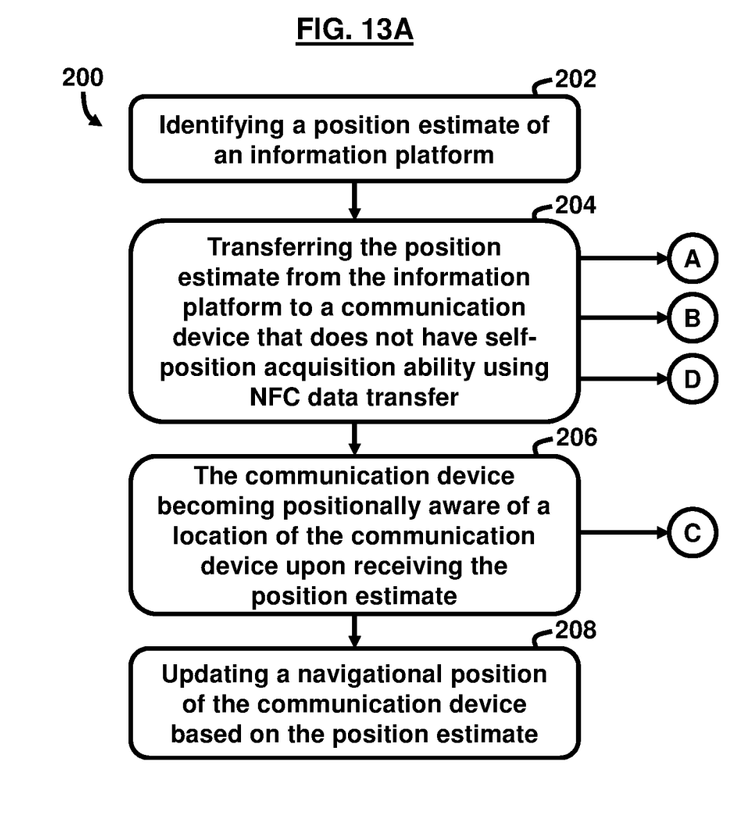
FIG. 13A is a flow diagram illustrating a method of transferring navigational data, according to an embodiment herein.

FIG. 13A, with reference to FIGS. 1 through 12, is a flow diagram illustrating a method 200 of transferring navigational data, the method 200 comprising identifying (202) a position estimate 135 of an information platform 140, and transferring (204) the position estimate 135 from the information platform 140 to a communication device 145 that does not have self-position acquisition ability using a NFC data transfer 150. The method 200 further comprises the communication device 145 becoming (206) positionally aware of a location of the communication device 145 upon receiving the position estimate 135. The method 200 further comprises updating (208) a navigational position 160 of the communication device 145 based on the position estimate 135.

Figure 13B:
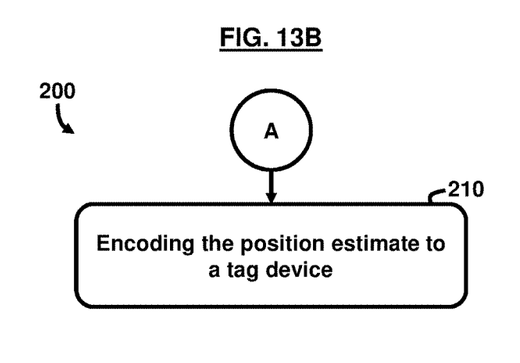
FIG. 13B is a flow diagram illustrating a method of transferring a position estimate using a tag device, according to an embodiment herein.
Figure 13C:
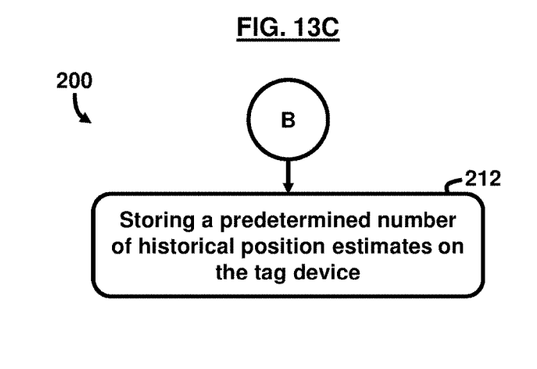
FIG. 13C is a flow diagram illustrating a method of transferring a position estimate using historical position estimates (e.g. at least one historical position estimate) on a tag device, according to an embodiment herein.
Figure 13D:
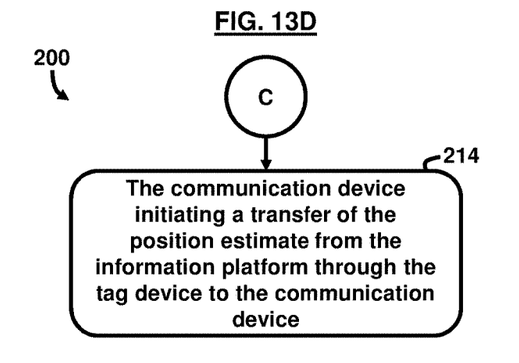
FIG. 13D is a flow diagram illustrating a method of initiating a transfer of a position estimate, according to an embodiment herein.
Figure 13E:
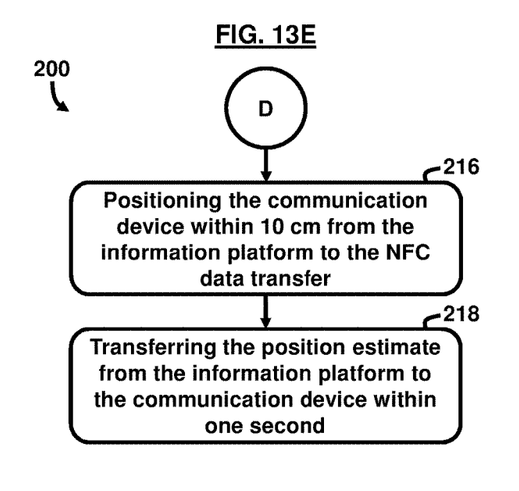
FIG. 13E is a flow diagram illustrating a method of positioning a communication device to facilitate NFC data transfer, according to an embodiment herein.

As shown in FIG. 13B, with reference to FIGS. 1 through 13A, the transferring (204) may comprise encoding (210) the position estimate 135 to a tag device 165. As shown in FIG. 13C, with reference to FIGS. 1 through 13B, the transferring (204) may comprise storing (212) a predetermined number of historical position estimates 136 on the tag device 165. As shown in FIG. 13D, with reference to FIGS. 1 through 13C, the method 200 may comprise the communication device 145 initiating (214) a transfer of the position estimate 135 from the information platform 140 through the tag device 165 to the communication device 145. Additional communication devices 170 may each initiate a subsequent transfer of the position estimate 135 from the information platform 140 through the tag device 165 to each additional communication device 170. The tag device 165 may comprise a memory component 175 that does not require electrical power to store the position estimate 135. The tag device 165 may comprise a NFC component 180 to transceive the position estimate 135. As shown in FIG. 13E, with reference to FIGS. 1 through 13D, the method 200 may comprise positioning (216) the communication device 145 within 10 cm from the information platform 140 to perform the NFC data transfer 150, and transferring (218) the position estimate 135 from the information platform 140 to the communication device 145 within one second.

A computer, smartphone, or tablet device comprising programmable modules may read the coordinates provided by the position estimate 135 in the NFC data transfer 150. Accordingly, the methods described in FIGS. 13A through 13E may be implemented as programmable modules. In an exemplary embodiment, the modules may be embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions that provide digital and/or analog signals for performing various functions as described herein. The various functions can further be embodied and physically saved as any of data structures, data paths, data objects, data object models, object files, and database components. For example, the data objects may be configured as a digital packet of structured data. The data structures may be configured as any of an array, tuple, map, union, variant, set, graph, tree, node, and an object, which may be stored and retrieved by computer memory and may be managed by processors, compilers, and other computer hardware components. The data paths may be configured as part of a computer CPU that performs operations and calculations as instructed by the computer logic instructions. The data paths could include digital electronic circuits, multipliers, registers, and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and may be a variable, a data structure, or a function. In the embodiments configured as relational databases (e.g., such Oracle® relational databases), the data objects may be configured as a table or column. Other configurations include specialized objects, distributed objects, object oriented programming objects, and semantic web objects, for example. The data object models may be configured as an application programming interface for creating HyperText Markup Language (HTML) and Extensible Markup Language (XML) electronic documents. The models may be further configured as any of a tree, graph, container, list, map, queue, set, stack, and variations thereof.

The data object files are created by compilers and assemblers and contain generated binary code and data for a source file. The database components can include any of tables, indexes, views, stored procedures, and triggers.

In other examples, the programmable modules may be configured as a computer program product that includes a pre-configured set of instructions, which when performed, can result in actions as stated in conjunction with the methods described above with respect to FIGS. 13A through 13E. In an example, the pre-configured set of instructions may be stored on a tangible non-transitory computer readable medium or a program storage device. In an example, the tangible non-transitory computer readable medium may be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps. The embodiments herein can include both hardware and software elements. The embodiments that are implemented in software include but are not limited to, firmware, resident software, microcode, etc.

The modules provided by the software-enabled embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chip may be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 14:
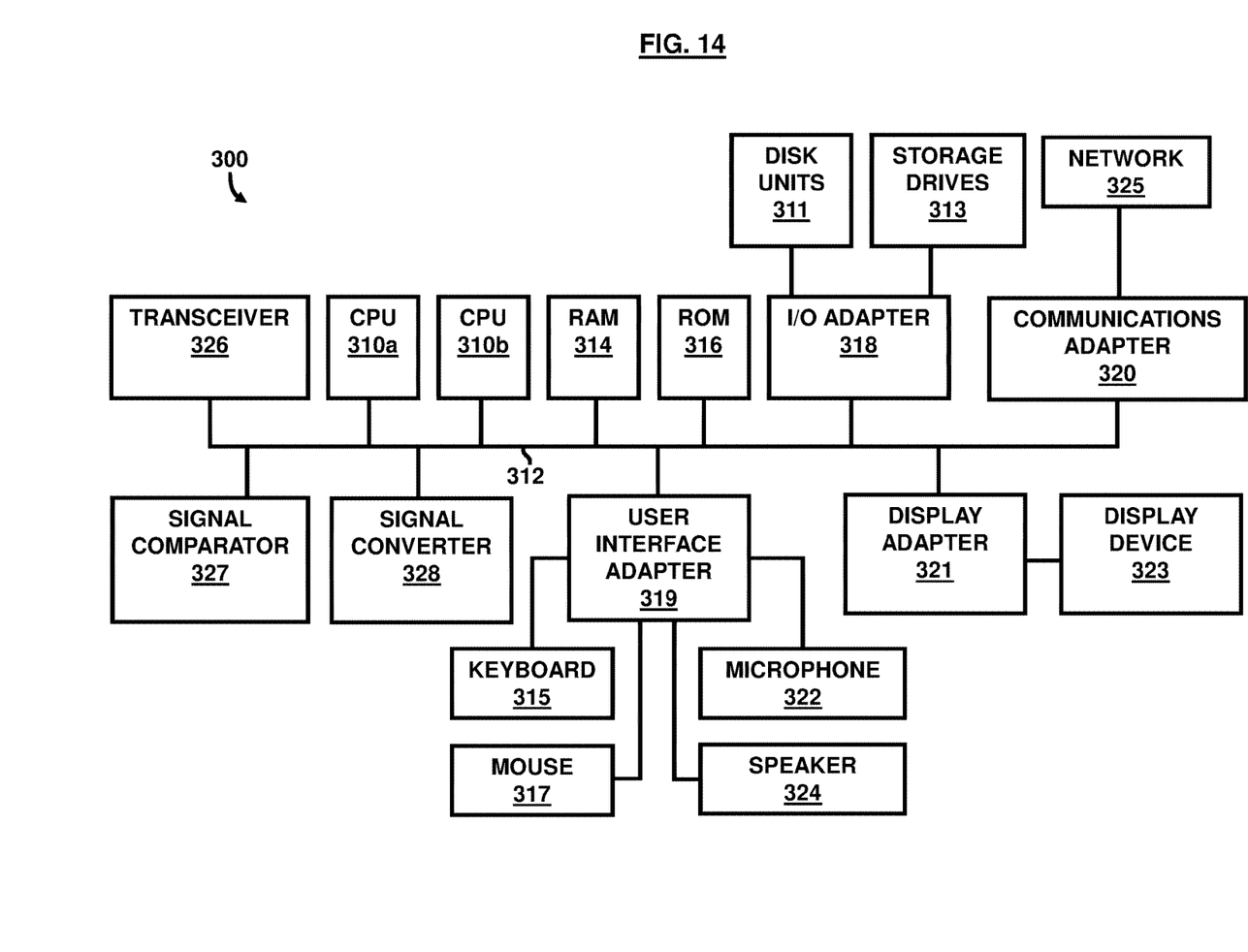
FIG. 14 is a block diagram illustrating a computer system used in accordance with the embodiments herein.

A representative hardware environment for practicing the module-configured embodiments herein is depicted in FIG. 14, with reference to FIGS. 1 through 13E. This schematic drawing illustrates a hardware configuration of an information handling/computer system 300 in accordance with an exemplary embodiment herein. The system 300 comprises at least one processor or central controller (CPU) 310a, 310b. The CPUs 310a, 310b are interconnected via system bus 312 to various devices such as a random access memory (RAM) 314, read-only memory (ROM) 316, and an input/output (I/O) adapter 318. The I/O adapter 318 can connect to peripheral devices, such as disk units 311 and storage drives 313, or other program storage devices that are readable by the system. The system 300 can read the inventive instructions on the program storage devices and follow these instructions to execute the methodology of the embodiments herein. The system 300 further includes a user interface adapter 319 that connects a keyboard 315, mouse 317, speaker 324, microphone 322, and/or other user interface devices such as a touch screen device (not shown) to the bus 312 to gather user input. Additionally, a communication adapter 320 connects the bus 312 to a data processing network 325, and a display adapter 321 connects the bus 312 to a display device 323, which provides a Graphical User Interface (GUI) (e.g., GUI 360) in accordance with the embodiments herein, or which may be embodied as an output device such as a monitor, printer, or transmitter, for example. Further, a transceiver 326, a signal comparator 327, and a signal converter 328 may be connected with the bus 312 for processing, transmission, receipt, comparison, and conversion of electric or electronic signals.

Practical initialization of man-portable relative navigation systems (such as inertial systems) in GNSS-denied environments is challenging due to time constraints, and due to security concerns with broadcasting data wirelessly. NFC could make inertial or related systems practical by reducing the exchange and starting position initialization time to under a second, while also ensuring that the system is unreadable from more than a few cm away. In an example, a dismounted soldier in a non-GPS accessible terrain could rapidly initialize his/her starting position and orientation by utilizing a high-quality position estimate during egress from the information platform 15.

In an example, the embodiments herein serve as a means to rapidly transfer position information from an advantaged GNSS receiver platform for the purposes of initializing or updating another device. The selected data transfer method is NFC, which is suitable for short-range wireless data transfer. This situation makes it possible for one device to read from persistent memory of the other, without power applied. Moreover, the technique provided by the embodiments herein usefully combines information transfer without negotiating a connection and transfers position information from an advantaged platform (e.g., information platform 15, 140) to another. Further, the embodiments herein transfer information with significantly greater precision and with much greater security than broadcast transmission. As such, the data transfer technique provided by the embodiments herein results in a successful transfer of data in tenths of a second.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A system for transferring data, the system comprising:
    an information platform to identify a navigational position of the information platform;
    a first near field communication (NFC) device attached to the information platform to transmit navigational position data; and
    a second NFC device to receive the navigational position data from the first NFC device through a NFC data transfer process to establish a navigational position of the second NFC device relative to the first NFC device and without further communication from the first NFC device wherein the transferring comprises encoding the position estimate to a tag device; the communication device initiating a transfer of the position estimate from the information platform through the tag device to the communication device; and wherein additional communication devices each initiate a subsequent transfer of the position estimate from the information platform through the tag device to each additional communication device.

2. A system for providing portable and relative navigation data, the system comprising:
    a global navigation satellite system (GNSS) communication device to identify a position estimate of the GNSS communication device, wherein the GNSS communication device comprises a first short-range transceiver device to store and transmit the position estimate; and
    a second short-range transceiver device, wherein the second short-range transceiver device is to:
        receive a near field communication (NFC) encoded data transmission of the position estimate from the first short-range transceiver device;
    become positionally aware of a location of the first short-range transceiver device; and
    initialize a starting navigational position of the second short-range transceiver device based on the position estimate wherein the second short-range transceiver device is to receive any of (i) a time estimate from the first short-range transceiver device, and (ii) an estimate of position accuracy from the first short-range transceiver device and wherein the second short-range transceiver device is to initialize the starting navigational position based only on the position estimate provided by the first short-range transceiver device; and wherein additional communication devices each initiate a subsequent transfer of the position estimate from the information platform through the tag device to each additional communication device.

3. A method of transferring navigational data, the method comprising:
    identifying a position estimate of an information platform;
    transferring the position estimate from the information platform to a communication device that does not have self-position acquisition ability using a near field communication (NFC) data transfer;
    the communication device becoming positionally aware of a location of the communication device upon receiving the position estimate; and
    updating a navigational position of the communication device based on the position estimate wherein the transferring comprises encoding the position estimate to a tag device;
    the communication device initiating a transfer of the position estimate from the information platform through the tag device to the communication device; and wherein additional communication devices each initiate a subsequent transfer of the position estimate from the information platform through the tag device to each additional communication device.

4. The method of claim 3, wherein the transferring comprises storing a predetermined number of historical position estimates on the tag device.

5. The method of claim 3, wherein the tag device comprises a memory component that does not require electrical power to store the position estimate.

6. The method of claim 3, wherein the tag device comprises a NFC component to transceive the position estimate.

7. The method of claim 3, comprising:
    positioning the communication device within 10 cm from the information platform to the NFC data transfer; and
    transferring the position estimate from the information platform to the communication device within one second.

* * * * *